Feb. 25, 1964
D. E. ATKINSON
3,122,689
CONTROL SYSTEM
Filed Feb. 21, 1961
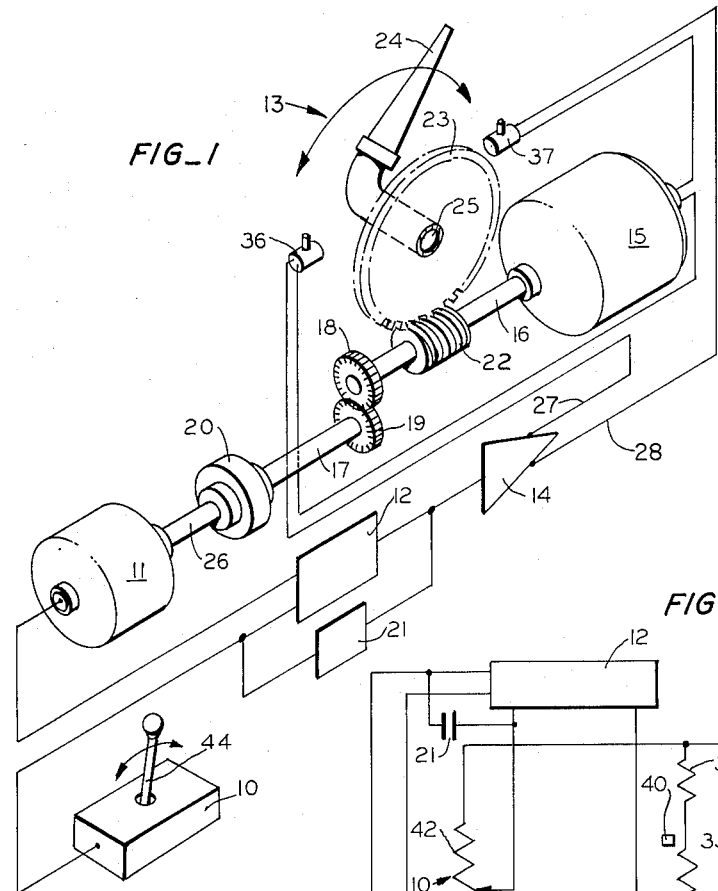
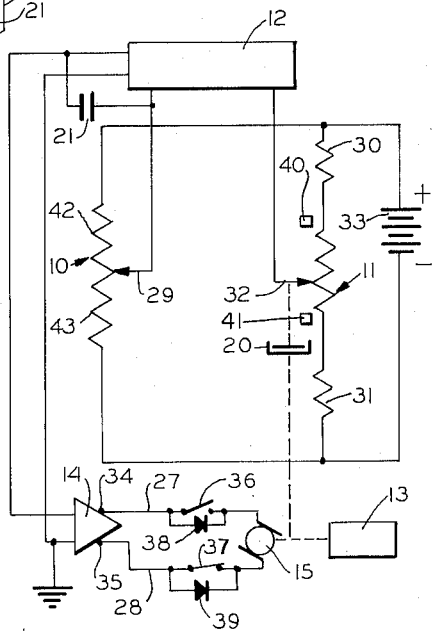
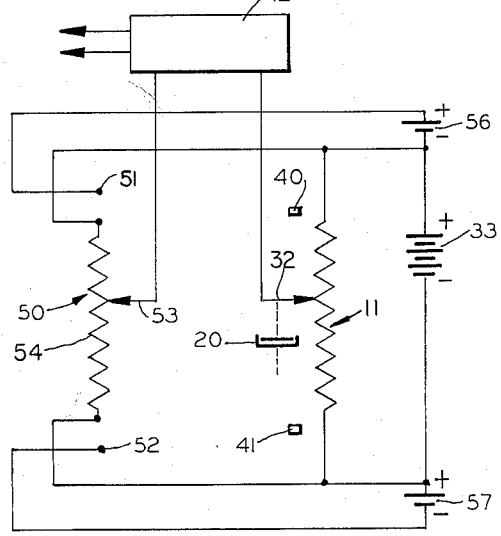
INVENTOR.
DUANE E. ATKINSON
BY
Boyken, Mohler & Wood
ATTORNEYS

United States Patent Office 3,122,689
Patented Feb. 25, 1964

3,122,689
CONTROL SYSTEM
Duane E. Atkinson, 102 Fey Drive, Burlingame, Calif.
Filed Feb. 21, 1961, Ser. No. 90,871
9 Claims. (Cl. 318—29)

This invention relates to a control system and more particularly to a feedback or closed loop system.

Control systems of the type herein described, often called servo systems, are employed for remotely controlling an output or characteristic of an operating device or appliance. Such outputs or controlled quantities as position, speed, temperature, volume, etc. are controlled by changing them in response to an error signal. Typically, the error signal is developed from a comparison of an input or command signal and an output or characteristic signal which is indicative of and fed back from the output.

The performance of such a control system is related to the ability of the output sensing or feedback device to distinguish small changes in the output. In a common application where potentiometers are employed as the sensing components to generate the command or input signal and the output signal which is fed back to the comparing device, which generates the error signal, this ability may be called the resolution of the potentiometer.

Where it is desired to control the output of an operating device over a substantial range of varied output employing a potentiometer having a given resolution to sense the output over the entire range results in the performance of the control system being limited, in part, by the resolution of the potentiometer. Since improvement of the resolution of a potentiometer or other output sensing device is customarily accompanied by substantially increased cost of manufacture as well as increased sensitivity to shock and the like, control systems of this type to be used in commercial installations and especially under greatly varying environment are practically limited as to their performance by the above factors.

It is therefore an object of this invention to provide a control system employing relatively low performance components but in which the performance of the system as a whole is substantially improved.

Another object of this invention is the provision of a feedback control system in which the control region of a feedback device is employed over a fractional portion only of the entire range of output to be controlled and means are provided for shifting said control region with respect to said output range.

A further object of this invention is the provision of a servo system for controlling the output of an operating device over a substantial output range in which fineness of control is maintained throughout the range with relatively coarse control system components.

It is yet another object of this invention to provide a control system of relatively cheap and rugged components and simple construction which is readily and easily employed by an unskilled operator to control a characteristic of an operating appliance throughout a substantial operating range.

Other objects and advantages will become apparent from the following description taken in connection with the accompanying drawings which:

FIG. 1 is a semischematic view of the general features of the control system of this invention;

FIG. 2 is a schematic wiring diagram of one embodiment of the control system of this invention;

FIG. 3 is a schematic wiring diagram of another embodiment of the control system of this invention.

In general, FIG. 1 illustrates the general combination of this invention in which a command means 10 for generating a command or input signal and a feedback or sensing means 11 for generating an opposing output or characteristic signal are connected to a comparing means 12 into which said signals are fed. Comparing means 12 compares said signals and develops therefrom an error signal which may be fed through an amplifier 14 to a control element or driving means 15. Control element 15 is connected to drive, in response to the error signal, the operating appliance or device 13, the output or a characteristic of which is to be controlled remotely by the system of this invention. A change in such output or characteristic of device 13 is sensed or reflected in feedback means 11 so that the output signal therefrom is indicative of such output or characteristic and the change therein tends to reduce the error signal from comparing means 12 to effectively zero.

In the example illustrated herein appliance 13 may be a movable device, such as a nozzle 24 swingably supported on a shaft 25 and connected by gear 23 and worm 22 to the shaft 16 of driving means such as motor 15. Assuming that the characteristic or output of nozzle 24 to be controlled is its position throughout an operating range of 180° of arc, feedback means 11 may be a follow-up potentiometer, the operating shaft 26 of which is connected to shaft 16 through meshed gears 18, 19 shaft 17, and a slip clutch 20.

In a conventional proportional position control system employing a potentiometer as command means 10 in a bridge network with follow-up potentiometer 11, an error signal, created by a different setting on the command potentiometer 10 than on follow-up potentiometer 11, causes the motor 15 to drive the equipment 13 to a new position. By following the equipment to its new position, potentiometer 11 balances the bridge network thereby reducing the error signal to effectively zero.

The performance of such a conventional servo system is related to the range over which the equipment is controlled and the fineness of distinction or resolution of the potentiometers used in the control system. For example, where nozzle 24 is mounted for swinging through an arc of 180° and relatively coarse potentiometers 10, 11 are used to proportionally control and follow the nozzle over the entire range, the performance of the system is relatively low. Employing potentiometers of the same degree of coarseness to proportionally control the position of the nozzle over only a fraction of the range, say ⅙ or 30°, will considerably improve the performance of the system because of the decreased range of application of the potentiometers.

This invention, therefore, contemplates improving the performance of a control system or servomechanism using relatively coarse components by reducing the region of control of the components and by providing means for shifting such control region over the range of operation of the equipment which is desired to be controlled.

In the embodiment of the invention illustrated in FIG. 2 the resistive elements of a command potentiometer 10 and a feedback or follow-up potentiometer 11 are connected in parallel legs across a power source, such as battery 33, so that substantially the same potential drop exists across each such leg. The pick-offs 29, 32, respectively, of potentiometers 10, 11 sense a potential within the limits of the drop across their respective potentiometers and are connected to comparing means 12 for feeding such potentials or signals thereto.

Comparing means 12 is connected to amplifier 14 so that the error signal or voltage developed by comparing means 12, from the algebraic difference between the input signal or voltage from command pick-off 29 and the output voltage from follow-up pick-off 32, may be amplified for the purpose of powering motor 15. Output terminals 34, 35 of amplifier 14 are connected by signal leads 27, 28 to the input terminals on motor 15. It will be understood that the functions ascribed herein to comparing means 12 and amplifier 14 are ordinarily performed by a single amplifying means.

During the proportional or servo mode of operation of the control system displacement of command pick-off 29, as by manipulation of a control lever 44 (FIG. 1) connected to said command pick-off, causes pick-off 29 to sense a voltage or input signal different from that sensed by follow-up pick-off 32. The difference in these voltages creates the error signal which, when amplified, causes motor 15 to drive equipment 13, that is, to change the position of nozzle 24 in proportion to the error signal. Since pick-off 32 of potentiometer 11 is connected to the equipment for sensing its position, said follow-up pick-off will move to a new position where it senses the same voltage as pick-off 29. At such time the input and output signals respectively generated at pick-offs 29 and 32 are equivalent, no effective error signal exists, and motor 15 and appliance 13 come to rest.

Follow-up potentiometer 11 is provided with stops or limits 40, 41 at the opposite extremes of its control region for limiting movement of pick-off 32 to said control region. The connection between appliance 13 and potentiometer 11 is such that pick-off 32 traverses the entire control region of the resistive element of said potentiometer over only a fractional part of the entire operating range of the appliance. In the example heretofore described, if nozzle 24 is desired to be operated over a 180° arc, pick-off 32 may be connected so as to traverse the entire control region of potentiometer 11 during movement of nozzle 24 over a 30° arc. Movement of nozzle 24 outside of this 30° arc cannot be followed or sensed by pick-off 32 as it is limited by stops 40 and 41, and a slip clutch 20 is provided in the connection between appliance 13 and pick-off 32 so that the potentiometer will be unaffected by such movement of the appliance outside the controlled fractional part of its operating range.

In order to shift the effective control region of potentiometer 11 and the corresponding fractional part of the operating range of appliance 13 with respect to the entire operating range, a pair of resistors 30, 31 are series connected in the leg on opposite sides of the resistive element of potentiometer 11. This additional resistance in the leg with potentiometer 11 decreases the voltage drop across said potentiometer's resistive element. The voltage levels at points 42, 43 on the resistive element of potentiometer 10 then correspond to the voltage levels at the extremes of the control region of potentiometer 11 at stops 40, 41.

So long as pick-off 29 is moved along the resistive element of potentiometer 10 between points 42 and 43 to create an input signal, equipment 13 will be controlled proportionally over the fractional part of its range, as previously described, and pick-off 32 will follow the position of the appliance to reduce the error signal to effectively zero. However, when pick-off 29 is moved outside points 42, 43 on potentiometer 10 it senses a voltage outside the extremes of voltages which pick-off 32 is capable of sensing.

For example, if pick-off 29 is moved on potentiometer 10 above point 42, an error signal will be generated causing the motor 15 to drive equipment 13 so that pick-off 32 follows the repositioning of said appliance until said follow-up hits stop 40. At this position pick-off 32 is incapable of sensing the higher voltage level of pick-off 29 and cannot therefore contribute to reduction of the error signal. Since the input signal from command pick-off 29 is higher than the maximum output signal from follow-up pick-off 32 an error signal of constant magnitude continues to cause motor 15 to drive appliance 13.

The coupling means, including potentiometer 11, which serves to connect the control or driving means 15 to the amplifying means 12, 14 for providing the feedback signal thereto, is so arranged that the feedback signal bears a predetermined relation to the position or other characteristic of the controlled appliance only during operation in the limited fractional portion of its entire operating range. When the appliance is operated in the remainder of its range, outside such limited portion, the feedback signal bears no such relation to or dependence on the appliance characteristic and is preferably constant at the extreme response of potentiometer 11.

This latter mode of operation of the control system may be denoted the slew mode, and it will be noted that so long as pick-off 29 senses a voltage outside the extremes of the control region of potentiometer 11 (that is, pick-off 29 is outside points 42, 43 on potentiometer 10), appliance 13 will continue to be driven in a direction specified by the constant error signal. When pick-off 29 is moved back into the region between points 42, 43 on potentiometer 10, pick-off 32 will again be able to respond to the change in output and to generate a signal indicative thereof for reducing the error signal to zero.

In the system herein described the error signal will be polarized, that is, it will direct a change in the operating characteristics (position of nozzle 24) in a direction depending upon its polarity. The polarity of the error signal is determined by the position of pick-off 29 with respect to pick-off 32 and it will be positive when the former is higher than the latter in FIG. 2 and negative when pick-off 29 is lower.

In a system where it is desired to control the characteristics or output of an appliance toward and away from an extreme of its range by a polarized error signal, interrupting means may be incorporated in the connection between the comparing or amplifying means and the control element to interrupt the response of the latter to the error signal. FIGS. 1, 2 illustrate such interrupting means in the form of normally closed limit switches 36, 37 in leads 27, 28 to motor 15. In the previous example said limit switches may be physically arranged at the ends of the 180° arc through which nozzle 24 is mounted for swinging so as to be opened for interrupting the appropriate lead upon said nozzle reaching one of the extremities of the operating range.

With the control system of FIG. 2 operating in the slew mode (with pick-off 29 above point 42 on potentiometer 10) nozzle 24 is driven to the left in FIG. 1 until it contacts and opens limit switch 36. This interruption in the lead 27 to motor 15 causes nozzle 24 to stop at the extremity of its operating range since the response of the motor to the positive error signal is interrupted. From this position moving pick-off 29 below point 42 on potentiometer 10 generates an input signal of lower voltage than that sensed by pick-off 32 at the upper extremity of potentiometer 11, causing comparing means 12 to generate an error signal of reverse or negative polarity. In order that such reverse error signal, when amplified, will supply power to motor 15 with limit switch 36 open, a unidirectional signal transmission means, such as diode 38, is connected in a shunt across such switch and arranged to permit passage of the negative error signal, as with its anode connected to the amplifier side of such switch. Diode 39 is correspondingly connected across the opposite limit switch 37.

In the previous example the reverse or negative polarity error signal causes current to bypass open limit switch 36, flowing through diode 38 in a direction to cause motor 15 to drive nozzle 24 to the right in FIG. 1 away from limit switch 36, thereby permitting such limit switch to close. The same operation will take place upon manipulation of pick-off 29 to the portion of potentiometer 10 below point 43 except that the polarity of the error signal will be changed from negative to positive.

It will be noted that the placement of diodes 38, 39 across limit switches 36, 37 permits automatic reversing of the equipment 13 without the necessity of further complicated circuits. Especially in applications where the controlled appliance and its associated limit switches are substantially removed from the amplifier, considerable savings may be accomplished in this manner.

The control system of this invention may be improved by the addition of a simple compensating device, such as capacitor 21 (FIGS. 1, 2) connected across comparing means 12 between pick-off 29 and the ungrounded input to amplifier 14. When said command pick-off is adjusted to a new position on potentiometer 10 a change in voltage occurs, the derivative of which is supplied by capacitor 21 to boost the error signal for providing additional starting current to motor 15. Thus, the presence of capacitor 21 speeds the response of motor 15 to the error signal to change the output of appliance 13.

It will be understood by those skilled in the art that the system of this invention may be arranged so that operation in the slew mode serves to shift the control region of the feedback potentiometer when the pick-off of the latter is other than at an extreme of its resistive element, if desired.

Alternative means for providing the command means with the capability of sensing a higher potential than that sensed by the follow-up means is illustrated in FIG. 3 in which command potentiometer 50 and follow-up potentiometer 11 are connected in parallel legs across battery 28. Potentiometer 50 is similar to potentiometer 10 except that the former is provided at its opposite extremes with contacts 51, 52 electrically insulated from the resistive element 54 of such potentiometer.

Pick-off 53 of potentiometer 50 is moved along resistive element 54 for creating an input signal which is fed into comparing means 12 for the purpose previously described. Pick-off 32 senses a voltage or signal indicative of the output of the controlled device and feeds its output signal to comparing means 12 which develops the error signal for changing the ouput of the controlled device. Pick-off 32 is connected to the controlled appliance by similar coupling means including a slip clutch 29.

Within its control regions, between stops 40 and 41, pick-off 32 of potentiometer 11 is capable of sensing the output of the controlled appliance and generating a signal corresponding to the input signal from potentiometer 50 to reduce the error signal to approximately zero. During this servo mode of operation the appliance is controlled proportionately over a fractional portion of its entire operating range as heretofore described.

Means rendering pick-off 53 of command potentiometer 50 capable of sensing a higher potential than that sensed by pick-off 32 of follow-up potentiometer 11 is provided by connecting independent potential sources, such as batteries 56, 57 across contacts 51, 52 and the respective extremes of resistive element 54. Contact 51 is connected to the positive terminal of battery 56, the negative terminal of which is connected to the positive terminal of battery 33, which is common to one extreme of resistive element 54. Contact 52 is connected to the negative terminal of battery 57 whose positive terminal is connected to the negative terminal of battery 33 and the other extreme of resistive element 54.

When pick-off 53 of potentiometer 50 is displaced beyond the extremes of resistive element 54 to either contact 51 or 52 it senses a voltage outside the control region of potentiometer 11, which causes a constant error signal, related to the different voltage sensed by arm 53, to be generated by comparing means 12. The constant error signal thereby developed during this slew mode of operation causes a continuous change in the output of the controlled appliance which is outside the control region of the follow-up potentiometer 11 and therefore cannot be sensed by it. Displacement of pick-off 53 onto resistive element 54, which corresponds to the control region of potentiometer 11, returns the system to its servo mode of operation.

In summary when nozzle 24 is being moved to a new position, the device of this invention may operate in either of two modes. Starting with the system at rest, operation in the proportional or servo mode is initiated by moving the pickoff of the command potentiometer (potentiometer 10 or potentiometer 50) to a new position in which it senses a potential which pick-off 32 of follow-up potentiometer 11 is capable of sensing. An error signal results from the potential difference which is caused to exist between the two pick-offs. The error signal is amplified and used to drive nozzle 24 and follow-up pick-off 32 until the latter senses a potential the same as that sensed by the pick-off of the command potentiometer. When the two pick-offs sense identical potentials the error signal is reduced to zero, and the system comes to rest.

Operation of the system in the slew mode is initiated by moving the pick-off of the command potentiometer to a new position in which it senses a potential which follow-up pick-off 32 is incapable of sensing. In FIG. 2, pick-off 29 would be moved to a position outside the portion of the resistive element of potentiometer 10 bounded by points 42, 43 to initiate slew mode operation, while pick-off 53 would be moved into contact with either of contacts 51, 52 to initiate slew mode operation in the alternate system of FIG. 3. As before, the resulting error signal is amplified and used to drive nozzle 24 and pick-off 32, but as the error signal reduces, pick-off 32 is driven to one end of the resistive element of potentiometer 11 where it strikes one of stops 40, 41. Clutch 29 which is interposed between the driving means and pick-off 32, slips as the latter strikes one of its stops, thus preventing damage to potentiometer 11. Since the two pick-offs cannot reach identical potentials, the amplified error signal continues to cause nozzle 24 to be driven until it strikes a limit switch or until the operator withdraws the system from the slew mode of operation by moving the pick-off of the command potentiometer back to a position in which it senses a potential which follow-up pick-off 32 is capable of sensing. In the latter instance, the system returns to the servo mode and as previously described, finally comes to rest with the pick-offs sensing identical potentials.

In a sense the control system of this invention combines some of the best features of a simple on-off control system with a proportional closed loop or feedback system. Under conditions where a relatively wide range of control is desired, operation of this system in the slew mode permits rapid change of the controlled characteristic or output throughout the entire range. Once the operator has by this method located the general area of the range within which fine proportional control is desired, the system may be operated in the servo mode. Since the control region of the feedback means is limited to a fraction of the entire operating range of the controlled device, the performance of the servomechanism is considerably increased over what it would be if such control region were applied over the entire operating range. Because the slew mode of operation also functions to shift the control region of feedback means over various segments of the operating range, fine control is provided throughout the operating range.

In addition, a control system incorporating this invention is simple and easy to operate even by an unskilled person. Since the shifting of the fine control servo region by operating in the slew mode is automatic and may be accomplished by a single control lever, the system is easily accommodated to the natural tendencies of the operator.

Although specific forms of the invention have been described herein in detail other forms will be obvious to those skilled in the art and is to be understood that all such forms are within the spirit of the invention and scope of the following claims.

I claim:

1. A feedback control system for controlling the output of a device over a substantial output range, comprising: feedback means capable of responding to said output within the control region of said feedback means corresponding to a controlled fractional part of said output range for generating an output signal dependent on said output within said fractional part of said range, command means for generating an input signal within the response capability of said feedback means, comparing means receiving said output signal and said input signal and generating an error signal from the comparison thereof, a control element connected to said device and said comparing means for changing the output of said device within said fractional part in response to said error signal, and slew means coupled with said command means for generating a slew signal outside the response capability of said feedback means and connected to said control element for shifting said fractional part with respect to said output range.

2. A feedback control system for controlling the output of a device over a substantial output range, comprising: feedback means capable of responding to said output within the control region of said feedback means corresponding to a controlled fractional part of said output range for generating an output signal dependent on said output within said fractional part of said range, command means for generating a first input signal within the response capability of said feedback means and a second input signal outside said response capability, comparing means receiving said output signal and said input signals and generating an error signal from the comparison thereof, a control element connected to said device and said comparing means for changing the output of said device in response to said error signal, said output being changed within said fractional part when said comparing means compares said output signal and said first input signal and outside said fractional part when said comparing means compares said output signal and said second input signal.

3. A control system for controling a characteristic of an operating appliance throughout its operating range comprising: driving means for changing said characteristic in response to an error signal, sensing means for sensing said characteristic over a portion of said operating range and generating a characteristic signal to a limit and related to said characteristic over said portion, command means capable of generating a command signal exceeding said limit, a comparing device connected to said command means and said sensing means for generating an error signal from comparison of said command signal and said characteristic signal, and connecting means connecting said comparing device and said driving means for transmitting said error signal to said driving means, whereby during operation of said appliance within said portion of said range said characteristic signal and said error signal vary inversely between effectively zero and said command signal and during operation of said appliance outside said portion said characteristic signal remains at said limit and said error signal is dependent upon the amount by which said command signal exceeds said limit.

4. A control system from remotely controlling the position of a movable device over a substantial range of movement, comprising: a command potentiometer located remotely from said device, a follow-up potentiometer, each of said potentiometers having a resistive element and a pick-off adjustable thereon, means for impressing a first voltage drop across said command resistive element and a second voltage drop across said follow-up resistive element, the magnitude of said first voltage drop being at least the magnitude of said second voltage drop, manually operable means for adjusting said command pick-off for sensing a command signal, connecting means connecting said device to said follow-up pick-off for sensing a position signal that is within said second voltage drop and dependent upon the position of said device within a fractional part of said range, comparing means connected to said pick-offs for generating an error signal that is the algebraic difference between said command and said position signals, driving means connected to said device and to said comparing means for changing the position of said device in response to said error signal, whereby within said fractional part of said range, said position signal approaches said command signal to eliminate said difference, and slew means impressing a slew signal voltage outside said second voltage drop on said command pick-off, whereby said follow-up pick off is incapable of sensing a position signal approaching said slew signal and said device is driven outside said fractional part of said range.

5. A control system for remotely controlling the position of a movable device over a substantial range of movement comprising: a command potentiometer located remotely from said device, a follow-up potentiometer, each of said potentiometers having a resistive element and a pick-off adjustable thereon, means for impressing a first voltage drop across said command resistive element and a second voltage drop across said follow-up resistive element, the magnitude of said first voltage drop being at least the magnitude of said second voltage drop, manually operable means for adjusting said command pick-off for sensing a command signal, connecting means connecting said device to said follow-up pick-off for adjusting the same for sensing a position signal that is within said second voltage drop and dependent upon the position of said device within a fractional part of said range, comparing means connected to receive the signals from said pick-offs and serving to generate an error signal that is the algebraic difference between said command and said position signals, driving means connected to said device and to said comparing means for changing the position of said device in response to said error signal, whereby, within said fractional part of said range, said position signal approaches said command signal to eliminate said difference, and slew means for impressing a slew signal voltage outside said second voltage drop on said command pick-off, whereby said follow-up pick-off is incapable of sensing a position signal approaching said slew signal and said device is driven outside said fractional part of said range, said connecting means permitting movement of said device outside said fractional part of said range while said follow-up pick-off senses a constant position signal.

6. A control system for remotely controlling the position of a movable device over a substantial range of movement, comprising: a command potentiometer located remotely from said device, a follow-up potentiometer, each of said potentiometers having a resistive element and a pick-off adjustable thereon, means for impressing a first voltage drop across said command resistive element and a second voltage drop across said follow-up resistive element, the magnitude of said first voltage drop being at least the magnitude of said second voltage drop, manually operable means for adjusting said command pick-off for sensing a command signal, connecting means connecting said device to said follow-up pick-off for adjusting the same for sensing a position signal that is within said second voltage drop and dependent upon the position of said device within a fractional part of said range, comparing means connected to receive the signals from said pick-offs and serving to generate an error signal that is the algebraic difference between said command and said position signals, driving means connected to said device and to said comparing means for changing the position of said device in response to said error signal, whereby, within said fractional part of said range, said position signal approaches said command signal to eliminate said difference, and slew means for impressing a slew signal voltage outside said second voltage drop on said command pick-off, whereby said follow-up pick-off is incapable of sensing a position signal approaching said slew signal and said device is driven outside said fractional part of said range, said connecting means permitting movement of said device outside said fractional part of said range while said follow-up pick-off senses a constant position signal, said slew means including at least one resistance connected in series with said follow-up resistance element.

7. A control system for remotely controlling the position of a movable device over a substantial range of movement, comprising: a command potentiometer located remotely from said device, a follow-up potentiometer, each of said potentiometers having a resistive element and a pick-off adjustable thereon, means for impressing a first voltage drop across said command resistive element and a second voltage drop across said follow-up resistive element, the magnitude of said first voltage drop being at least the magnitude of said second voltage drop, manually operable means for adjusting said command pick-off for sensing a command signal, connecting means connecting said device to said follow-up pick-off for adjusting the same for sensing a position signal that is within said second voltage drop and dependent upon the position of said device within a fractional part of said range, comparing means connected to receive the signals from said pick-offs and serving to generate an error signal that is the algebraic difference between said command and said position signals, driving means connected to said device and to said comparing means for changing the position of said device in response to said error signal, whereby, within said fractional part of said range, said position signal approaches said command signal to eliminate said difference, and slew means for impressing a slew signal voltage outside said second voltage drop on said command pick-off, whereby said follow-up pick-off is incapable of sensing a position signal approaching said slew signal and said device is driven outside said fractional part of said range, said connecting means permitting movement of said device outside said fractional part of said range while said follow-up pick-off senses a constant position signal, said slew means including at least one contact electrically connectable to said command pick-up and a voltage source connected across said contact and said command resistive element.

8. A control system for controlling a characteristic of an operating appliance throughout its operating range, comprising: driving means for changing said characteristic in response to an error signal, sensing means for sensing said characteristic over a portion of said operating range and generating a characteristic signal to a limit and related to said characteristic over said portion, command means capable of generating a command signal exceeding said limit, a comparing device connected to said command means and said sensing means for generating an error signal from comparison of said command signal and said characteristic signal, and connecting means connecting said comparing device and said driving means for transmitting said error signal to said driving means, whereby during operation of said appliance within said portion of said range said characteristic signal and said error signal vary inversely between effectively zero and said command signal and during operation of said appliance outside said portion said characteristic signal remains at said limit and said error signal is dependent upon the amount by which said command signal exceeds said limit, interrupting means for interrupting said connecting means when said characteristic is at an extreme of said range, and a shunt across said interrupting means including unidirectional signal transmission means arranged to permit passage of an error signal opposed to that which caused said characteristic to reach said extreme.

9. A closed loop servo system, comprising amplifier means arranged to receive an input signal and a feedback signal which is in opposition to said input signal, said amplifier means providing a polarized error signal as an output therefrom, control means responsive to said error signal for controlling a variable characteristic of a controlled device as a function of said error signal toward and away from an extreme of the range of variance of said characteristic depending on the polarity of said error signal, coupling means serving to connect said control means to said amplifier means for providing said feedback signal thereto, which feedback signal bears a predetermined relation to said characteristic during variance thereof over a limited portion only of said range, interrupting means interrupting the response of said control means to an error signal of one polarity as said characteristic approaches said extreme, and unidirectional signal transmission means bypassing said interrupting means for transmitting an error signal of opposite polarity to said control means.

References Cited in the file of this patent

UNITED STATES PATENTS

| | | |
|---|---|---|
| 2,755,421 | Roosdorp | July 17, 1956 |
| 2,781,482 | Montgomery | Feb. 12, 1957 |
| 2,796,569 | McDonald et al. | June 18, 1957 |
| 2,798,992 | Adler et al. | July 9, 1957 |
| 2,860,293 | Salmanovich | Nov. 11, 1958 |
| 2,921,247 | Morrison | Jan. 12, 1960 |